(12) United States Patent
Tanaka et al.

(10) Patent No.: US 9,080,008 B2
(45) Date of Patent: Jul. 14, 2015

(54) POLYLACTIC ACID RESIN AND METHOD FOR PRODUCING SAME

(75) Inventors: Tsuyoshi Tanaka, Nagoya (JP); Sadanori Kumazawa, Nagoya (JP); Hiroyuki Ome, Tokai (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 14/234,478

(22) PCT Filed: Jul. 18, 2012

(86) PCT No.: PCT/JP2012/068168
§ 371 (c)(1),
(2), (4) Date: Jan. 23, 2014

(87) PCT Pub. No.: WO2013/015164
PCT Pub. Date: Jan. 31, 2013

(65) Prior Publication Data
US 2014/0142276 A1 May 22, 2014

(30) Foreign Application Priority Data

Jul. 28, 2011 (JP) ................................. 2011-165038
Jul. 28, 2011 (JP) ................................. 2011-165039

(51) Int. Cl.
*C08G 63/91* (2006.01)
*C08G 63/06* (2006.01)
*C08G 63/80* (2006.01)

(52) U.S. Cl.
CPC ............... *C08G 63/06* (2013.01); *C08G 63/80* (2013.01)

(58) Field of Classification Search
CPC ............................... C08G 63/06; C08G 63/80
See application file for complete search history.

(56) References Cited

U.S. PATENT DOCUMENTS

2008/0039579 A1* 2/2008 Kimura et al. ................. 524/556
2011/0065871 A1 3/2011 Nagano

FOREIGN PATENT DOCUMENTS

| | | |
|---|---|---|
| CN | 101805498 | 8/2010 |
| JP | 8183840 | 7/1996 |
| JP | 8193124 | 7/1996 |
| JP | 8231688 | 9/1996 |
| JP | 11106499 | 4/1999 |
| JP | 2000273165 | 10/2000 |
| JP | 2000297143 | 10/2000 |
| JP | 2000297145 | 10/2000 |
| JP | 2000302852 | 10/2000 |
| JP | 2001064375 | 3/2001 |
| JP | 2001192444 | 7/2001 |
| JP | 2004-026876 | 1/2004 |
| JP | 2006-028336 | 2/2006 |
| JP | 2009-013352 | 1/2009 |
| JP | 2009-024058 | 2/2009 |
| JP | 2009-024081 | 2/2009 |
| JP | 2009-067856 | 4/2009 |
| JP | 2009144132 | 7/2009 |
| JP | 2010-209321 | 9/2010 |
| WO | 2009142196 | 11/2009 |
| WO | WO 2010/147176 | 12/2010 |

OTHER PUBLICATIONS

International Search Report for PCT/JP2012/068168 and English Translation, Japanese Patent Office, Sep. 18, 2012.
Entire patent prosecution history of U.S. Appl. No. 13/825,992, filed Mar. 26, 2013, entitled, "Process for Production of Poly(Lactic Acid)-Type Resin, and Poly(Lactic Acid)-Type Prepolymer."

* cited by examiner

*Primary Examiner* — Ana Woodward
(74) *Attorney, Agent, or Firm* — RatnerPrestia

(57) ABSTRACT

The present invention is directed to a method for producing a polylactic acid resin, including the step of subjecting a crystallized prepolymer, which is a prepolymer including a lactic acid unit as a main component, and has an optical purity (Ea) of 60 to 94%, a weight average molecular weight of 5,000 to 100,000, and a crystal melting enthalpy ($\Delta$Hma) of 4 to 50 J/g, to solid phase polymerization. According to the present invention, it is possible to obtain a polylactic acid resin which is excellent in moldability upon melt processing and draw-down resistance upon melt processing, and is also excellent in hydrolysis resistance.

6 Claims, No Drawings

POLYLACTIC ACID RESIN AND METHOD FOR PRODUCING SAME

CROSS REFERENCE TO RELATED APPLICATIONS

This is the U.S. National Phase application of PCT International Application No. PCT/JP2012/068168, filed Jul. 18, 2012, and claims priority to Japanese Patent Application No. 2011-165038, filed Jul. 28, 2011, and to Japanese Patent Application No. 2011-165039, filed Jul. 28, 2011, the disclosures of each of these applications being incorporated herein by reference in their entireties for all purposes.

FIELD OF THE INVENTION

The present invention relates to a polylactic acid resin which is suited for being processed into a film or a sheet, and a method for efficiently producing the same.

BACKGROUND OF THE INVENTION

From the viewpoint of environmental protection, a polylactic acid resin using plants as raw materials has recently attracted attention. Main method for producing a polylactic acid resin includes a ring-opening polymerization method in which lactide as a dimer of lactic acid is polymerized through ring-opening, and a direct polycondensation method in which dehydration polycondensation is performed using lactic acid. While the direct polycondensation method is capable of producing polylactic acid at low cost as compared with the ring-opening polymerization method since lactic acid can be used as a direct polymerization raw material without undergoing the step of synthesizing lactide, there is a problem that the obtained polylactic acid resin has a low molecular weight. Therefore, there is disclosed a production method using direct polycondensation in combination with solid phase polymerization (Patent Literatures 1 and 2).

However, in case a solid phase polymerization treatment of a polylactic acid resin is performed, the step of performing crystallization in advance is required. Low degree of crystallinity of the polylactic acid resin may cause fusion between pellets of the polylactic acid resin during the solid phase polymerization treatment. However, the polylactic acid resin has a problem that it requires a long-term treatment so as to obtain sufficient degree of crystallinity because of its low crystallization rate. Therefore, various methods for improving the crystallinity have been studied (Patent Literatures 3 to 6, etc.).

[Patent Literature 1]
International Publication WO 2010/147176
[Patent Literature 2]
Japanese Unexamined Patent Publication (Kokai) No. 2010-209321
[Patent Literature 3]
Japanese Unexamined Patent Publication (Kokai) No. 2009-13352
[Patent Literature 4]
Japanese Unexamined Patent Publication (Kokai) No. 2009-24058
[Patent Literature 5]
Japanese Unexamined Patent Publication (Kokai) No. 2009-24081
[Patent Literature 6]
Japanese Unexamined Patent Publication (Kokai) No. 2009-67856

SUMMARY OF THE INVENTION

A polylactic acid resin can be used after being formed into a film, a sheet, a fiber, and an injection molded article. However, it was difficult for a polylactic acid resin having high crystallinity to be formed into a film and a sheet because of insufficient melt processability. On the other hand, use of a polylactic acid resin having low crystallinity, that is, a polylactic acid resin having low optical purity enables an improvement in moldability upon melt processing. However, it is required for the resin used for the film and sheet to have excellent drawdown resistance upon melt processing and hydrolysis resistance. According to a conventional production method, it was impossible to obtain a polylactic acid resin which has low optical purity and is also excellent in drawdown resistance and hydrolysis resistance. When using a ring-opening polymerization method, a polylactic acid resin having low optical purity and excellent moldability upon melt processing can be obtained, but a polylactic acid resin excellent in drawdown resistance and hydrolysis resistance cannot be obtained. On the other hand, in the case of using a production method using a direct polycondensation method in combination of a solid phase polymerization, a polylactic acid resin having excellent drawdown resistance and hydrolysis resistance can be obtained, but a polylactic acid resin having low optical purity and excellent moldability upon melt processing cannot be obtained.

As a result of intensive study so as to solve such problems, the present invention preferably employs the following means.

The present invention is directed to a method for producing a polylactic acid resin, including the step of subjecting a crystallized prepolymer, which is a prepolymer including a lactic acid unit as a main component, and has an optical purity (Ea) of 60 to 94%, a weight average molecular weight of 5,000 to 100,000, and a crystal melting enthalpy ($\Delta Hma$) of 4 to 50 J/g, to solid phase polymerization.

The present invention is also directed to a polylactic acid resin having an optical purity (Eb) of 60 to 94%, a weight average molecular weight of 150,000 to 300,000, and molecular weight distribution of 2.2 or more.

According to the present invention, it is possible to obtain a polylactic acid resin which is excellent in moldability upon melt processing and drawdown resistance upon melt processing, and is also excellent in hydrolysis resistance.

DETAILED DESCRIPTION OF EMBODIMENTS OF THE INVENTION

In the present invention, each of a prepolymer and a polylactic acid resin is a polymer containing L-lactic acid and/or D-lactic acid as main component(s), and is called poly-L-lactic acid when L-lactic acid is a main component, or called poly-D-lactic acid when D-lactic acid is a main component. "L-lactic acid is a main component" means that the polymer includes more than 50 mol % of an L-lactic acid unit, "D-lactic acid is a main component" means that the polymer includes more than 50 mol % of a D-lactic acid unit.

Each of a prepolymer and a polylactic acid resin is preferably a copolymer including an L-lactic acid unit and a D-lactic acid unit. When each of a prepolymer and a polylactic acid resin is poly-L-lactic acid, it preferably includes 3 mol % or more and 20 mol % or less, more preferably 4 mol % or more and 15 mol % or less, still more preferably 4 mol % or more and 10 mol % or less, and particularly preferably 4 mol % or more and 8 mol % or less of a D-lactic acid unit. When each of a prepolymer and a polylactic acid resin is poly-D-lactic acid, it preferably includes 3 mol % or more and 20 mol % or less, more preferably 4 mol % or more and 15 mol % or less, still more preferably 4 mol % or more and 10 mol % or less, and particularly preferably 4 mol % or more and 8 mol % or less of poly-D-lactic acid.

A crystallized prepolymer used in the present invention can be obtained by crystallizing a prepolymer by the below-mentioned crystallization step. It is necessary that the crystallized prepolymer has an optical purity (Ea) in a range from 60 to 94%. The optical purity (Ea) is more preferably in a range from 70 to 92% in that fusion is less likely to occur upon solid phase polymerization and satisfactory yield is achieved, and still more preferably in a range from 80 to 92% in that crystallization easily occurs. The optical purity is particularly preferably in a range from 84 to 92% in that a high molecular weight polymer is obtainable, and most preferably in a range from 88 to 92%. It is not preferred that the optical purity of the crystallized prepolymer is lower than 60% since an increase in heat treatment time required for crystallization may cause coloration, or an increase in time required for solid phase polymerization may cause a decrease in productivity. It is not preferred that the optical purity of the crystallized prepolymer is higher than 94% since an increase in glass transition temperature may cause a decrease in molecular mobility of a polymer in a solid phase polymerization temperature region, and thus an increase in molecular weight due to solid phase polymerization becomes less likely to proceed. The optical purity (Ea) of the crystallized prepolymer is the value to be determined from L-lactic acid content l and D-lactic acid content d, measured using high-performance liquid chromatography after hydrolyzing the crystallized prepolymer into a monomer unit, through the following equation (A).

$$Ea=|l-d|/(l+d)\times100(\%) \quad (A)$$

It is necessary that the crystallized prepolymer has a weight average molecular weight in a range from 5,000 to 100,000. The weight average molecular weight of the crystallized prepolymer is preferably in a range from 7,000 to 80,000 in that fusion is less likely to occur upon solid phase polymerization and satisfactory yield is achieved, and more preferably in a range from 10,000 to 50,000 in that a high molecular weight polymer is obtainable. In the present invention, high productivity is obtainable by performing solid phase polymerization using the crystallized prepolymer having a molecular weight in the above range. In the present invention, the weight average molecular weight of each of a prepolymer and a polylactic acid resin is a standard polymethyl methacrylate-equivalent weight average molecular weight measured by gel permeation chromatography (GPC) using hexafluoroisopropanol as a solvent.

The crystallized prepolymer preferably has an inherent viscosity, measured at 25° C. using an o-chlorophenol solution, in a range from 0.36 to 1.60 dl/g, and more preferably from 0.50 to 1.25 dl/g.

The optical purity and weight average molecular weight of the prepolymer before and after the crystallization step are nearly maintained.

It is necessary that the crystallized prepolymer has a crystal melting enthalpy (ΔHma) in a range from 4 to 50 J/g. The crystal melting enthalpy (ΔHma) of the crystallized prepolymer is preferably 9 J/g or more, more preferably 14 J/g or more, and particularly preferably 20 J/g or more in that fusion is less likely to occur upon solid phase polymerization. The crystal melting enthalpy (ΔHma) is preferably 45 J/g or less, and more preferably 40 J/g or less in that solid phase polymerization efficiently proceeds. It is not preferred that the crystal melting enthalpy (ΔHma) is less than 4 J/g since the prepolymer has low terminal end concentration because of too large amorphous region in the crystallized prepolymer, solid phase polymerization does not sufficiently proceed. It is not preferred that the crystal melting enthalpy (ΔHma) is more than 50 J/g since the degree of crystallinity remarkably increases in the solid phase polymerization step and molecular chain is excessively restricted, end contact frequency decreases and thus the molecular weight reached the limit in a solid phase polymerization reaction. In the present invention, use of the crystallized prepolymer having the crystal melting enthalpy (ΔHma) in the above range enables exhibition of high solid phase polymerizability to obtain a high molecular weight polylactic acid resin which is particularly excellent in moldability and mechanical properties. The crystal melting enthalpy (ΔHma) is enthalpy of a peak of melting by temperature rise measured by a differential scanning calorimeter (DSC).

The present inventors have also found that preferable range of the crystal melting enthalpy (ΔHma) of the crystallized prepolymer is influenced by the optical purity (Ea (%)) of the crystallized prepolymer. Namely, in order to obtain a high molecular weight polylactic acid resin, a relation between the crystal melting enthalpy (ΔHma) and the optical purity (Ea (%)) preferably satisfies the inequality expression (1), more preferably the inequality expression (4), and still more preferably the inequality expression (5).

$$24 \leq \Delta Hma(J/g)+(100-Ea(\%))/2 \leq 53 \quad (1)$$

$$29 \leq \Delta Hma(J/g)+(100-Ea(\%))/2 \leq 49 \quad (4)$$

$$34 \leq \Delta Hma(J/g)+(100-Ea(\%))/2 \leq 44 \quad (5)$$

Methods for producing a crystallized prepolymer and a polylactic acid resin will be described below. In the present invention, using lactic acid as a raw material, a polylactic acid prepolymer is produced by direct polycondensation. It is preferred to use, as a raw material, lactic acid containing alcohols in the total amount of 70 ppm or less, organic acids in the total amount of 800 ppm or less, aldehydes in the total amount of 50 ppm or less, and esters in the total amount of 400 ppm or less as impurities.

The optical purity of lactic acid to be used is preferably 60% or more, more preferably 70% or more in that fusion is less likely to occur upon solid phase polymerization and satisfactory yield is achieved, still more preferably 80% or more in that crystallization easily occurs, particularly preferably 84% or more in that a high molecular weight polymer is easily obtainable, and most preferably 88% or more.

In order to adjust the optical purity of lactic acid in the above range, when lactic acid is L-lactic acid, the content of D-lactic acid is preferably 20 mol % or less, more preferably 15 mol % or less, still more preferably 10 mol % or less, particularly preferably 8 mol % or less, and most preferably 6 mol % or less. When lactic acid is D-lactic acid, the content of L-lactic acid is preferably 20 mol % or less, more preferably 15 mol % or less, still more preferably 10 mol % or less, particularly preferably 8 mol % or less, and most preferably 6 mol % or less. It is also possible to decrease the optical purity by racemization upon melt polymerization.

In the present invention, regarding the polylactic acid resin, other components except for L-lactic acid or D-lactic acid may be copolymerized as long as performances of the obtained polylactic acid resin are not impaired. Examples of other components include polyhydric carboxylic acid, polyhydric alcohol, hydroxycarboxylic acid, lactone, and the like. Specific examples thereof include polyhydric carboxylic acids such as succinic acid, adipic acid, sebacic acid, fumaric acid, terephthalic acid, isophthalic acid, 2,6-naphthalenedicarboxylic acid, 5-sodiumsulfoisophthalic acid, cyclohexanedicarboxylic acid, 5-tetrabutylphosphoniumsulfoisophthalic acid, and furandicarboxylic acid, or derivatives thereof; polyhydric alcohols such as ethylene glycol, propylene glycol, butanediol, pentanediol, hexanediol, octanediol, isosorbide, neopentyl glycol, glycerin, trimethylolpropane, pentaerythritol, trimethylolpropane, polyhydric alcohol obtained by adding ethylene oxide or propylene oxide to pentaerythritol, aromatic polyhydric alcohol obtained by an addition reaction of bisphenol with ethylene oxide, diethylene glycol, triethylene glycol, polyethylene glycol, and polypropylene glycol, or derivatives thereof; hydroxycarboxylic acids such as glycolic acid, 3-hydroxybutyric acid, 4-hydroxybutyric acid, 4-hydroxyvaleric acid, and 6-hydroxycaproic acid; lactones such as glycolide, ε-caprolactone glycolide, ε-caprolactone, β-propiolactone, δ-butyrolactone, β- or γ-butyrolactone, pivalolactone, and δ-valerolactone; and the like.

There is no particular limitation on the method for producing a prepolymer, and the prepolymer can be produced by a known direct polycondensation using lactic acid as a raw material. Either batch polymerization or continuous polymerization may be used, and continuous polymerization is preferable in that carboxyl terminal content can be decreased and also the effects of improving fluidity and hydrolysis resistance are enhanced. In the present invention, the product obtained by melt polymerization is called a prepolymer, the product obtained by crystallizing a prepolymer is called crystallized prepolymer, and the product obtained by solid phase polymerization of a crystallized prepolymer is called a polylactic acid resin.

First, the melt polymerization step will be described. A polymerization catalyst is preferably a compound selected from a tin compound, a titanium compound, a lead compound, a zinc compound, a cobalt compound, an iron compound, a lithium compound, a rare earth compound, an antimony compound, a bismuth compound, a sulfur-containing compound containing sulfur having an oxidation number of +5 or more, and a phosphorus compound in that a polylactic acid resin having a high molecular weight is obtainable. The catalyst is more preferably a compound selected from a tin compound, a titanium compound, a rare earth compound, a sulfur-containing compound containing sulfur having an oxidation number of +5 or more, and a phosphorus compound. The catalyst is still more preferably an organic carboxylic acid salt of tin, having two ligands, in that it is possible to obtain a polylactic acid resin which is also excellent in thermostability and color hue, and particularly preferably tin (II) acetate or tin (II) octylate. The sulfur-containing compound containing sulfur having an oxidation number of +5 or more is preferably a sulfonic acid compound. It is also possible to use two or more catalysts in combination. When using catalysts in combination, it is preferred to use one or more catalysts selected from tin compounds and one or more catalysts selected from sulfur-containing compounds containing sulfur having an oxidation number of +5 or more.

There is no particular limitation on the addition amount of the catalyst, and the catalyst is preferably added in the amount of 0.0001 to 2 parts by weight, more preferably 0.001 to 1 part by weight, still more preferably 0.005 to 0.5 part by weight, and particularly preferably 0.01 to 0.3 part by weight, based on 100 parts by weight of the polylactic acid resin.

When using a sulfur-containing compound containing sulfur having an oxidation number of +5 or more as the catalyst, the addition amount is preferably from 30 to 3,000 ppm, more preferably from 35 to 2,700 ppm, still more preferably from 40 to 2,500 ppm, and particularly preferably from 45 to 2,200 ppm in terms of a sulfur atom based on raw material (s) (L-lactic acid and/or D-lactic acid, etc.) in that it is possible to efficiently obtain a polylactic acid resin having a high molecular weight.

Regarding timing of the addition of the catalyst, it is preferably added upon initiation of the melt polymerization step, or during melt polymerization step in that it is possible to efficiently obtain a high molecular weight polylactic acid resin.

There is no particular limitation on reaction conditions of the melt polymerization step, and the melt polymerization step is preferably performed at a temperature of 140 to 180° C. as a substantial reaction temperature in that it is possible to efficiently obtain a polylactic acid resin having a high molecular weight, more preferably a temperature of 145 to 175° C. in that it is possible to efficiently obtain a polylactic acid resin which is also excellent in color hue, and still more preferably at a temperature of 140 to 170° C. The melt polymerization step may be performed under either a single stage temperature condition where the temperature is maintained at a given temperature, or a multi-stage temperature condition where the temperature is stepwisely changed into a two- or higher multi-stage, and is preferably performed under a two- or higher multi-stage temperature condition in that it is possible to efficiently obtain a polylactic acid resin having a high molecular weight and a high melting point. For example, it is possible to exemplify a method in which a reaction is performed at a temperature of 140 to 160° C., and then a reaction is performed at a temperature of 160 to 180° C.

The melt polymerization step is preferably performed under a pressure of 0.13 to 130 kPa as a substantial reaction pressure in that it is possible to efficiently obtain a polylactic acid resin having a high molecular weight, more preferably 1 to 100 kPa in that it is possible to efficiently obtain a polylactic acid resin which is also excellent in color hue, still more preferably 10 to 90 kPa, yet more preferably 10 to 80 kPa, and particularly preferably 20 to 70 kPa. The melt polymerization step may be performed either under a single stage pressure condition where the pressure is maintained at a given pressure, or a multi-stage pressure condition where the pressure is stepwisely changed into a two- or higher multi-stage, and is preferably performed under a pressure under a two- or higher multi-stage pressure condition in that an increase in molecular weight can be achieved and color hue is excellent. For example, it is possible to exemplify a method in which a reaction is performed under a pressure of 13.3 to 66.6 kPa, and then a reaction is performed under a pressure of 1.3 to 6.5 kPa. It is also preferred to react in a stream of an inert gas such as nitrogen.

It is preferred that the melt polymerization step is continuously performed under reaction conditions including at least two-stage conditions, namely, condition at a temperature of 140° C. to 160° C. under a pressure of 13.3 to 66.6 kPa, and condition at a temperature 160° C. to 180° C. under a pressure of 1.3 to 6.5 kPa.

The melt polymerization step is preferably performed for a reaction time of 0.5 to 50 hours. The melt polymerization step is preferably performed for a reaction time of 1 to 45 hours in that it is possible to efficiently obtain a polylactic acid resin which is also excellent in color hue, more preferably 2 to 40 hours, still more preferably 3 to 35 hours, and particularly preferably 4 to 30 hours. In the case of performing the melt polymerization step at the temperature under the pressure under a two- or higher multi-stage condition, for example, it is possible to exemplify a method in which a reaction is performed at a temperature of 140 to 160° C. under a pressure of 13.3 to 66.6 kPa for a the reaction time of 2 to 15 hours, and then a reaction is performed at a temperature of 160 to 180° C. under a pressure of 1.3 to 6.5 kPa for a reaction time of 2 to 15 hours. Even in the case of performing at the temperature under the pressure under a two- or higher multi-stage condition, the total of the reaction time of the melt polymerization step is preferably from 0.5 to 50 hours.

In case the melt polymerization step is performed by a batch method, the time required to reach a substantial reaction temperature from room temperature is preferably within 30% of the step time, more preferably within 20%, and still more preferably within 10%. The time required to reach a substantial reaction pressure from normal pressure is preferably within 50% of the step time, more preferably within 40%, and still more preferably within 30%.

There is no particular limitation on a reaction vessel to be used in the melt polymerization step and it is possible to use, for example, a stirring vessel type reaction vessel, a mixer type reaction vessel, a column type reaction vessel, an extruder type reaction vessel, and the like. It is preferred to use an apparatus in which a reaction vessel is connected to a reflux condenser in that it is possible to efficiently obtain a polylactic acid resin which is also excellent in high molecular weight and color hue. The reflux condenser is preferably connected to the upper portion of the reaction vessel and, more preferably, a vacuum pump is connected to the reflux condenser. The reflux condenser serves to separate volatile components, and includes a vaporization section having a function of removing a part of the volatile components out of the reaction system, and a condensation section having a function of returning a part of the volatile components into the reaction system. Specifically, any reflux condenser can be used as long as it has a function of removing water among volatile components, and returning lactic acid and lactide or a low molecular weight polymer thereof to the reaction vessel of the melt polymerization step. Here, examples of the condenser constituting the condensation section include a double pipe type condenser, a multi-pipe type condenser, a coil type condenser, a plate type condenser, a plate fin type condenser, a centrifugal type condenser, a jacket type condenser, and the like. The reaction vessel may include one reaction chamber, or may be composed of two or more reaction chambers partitioned by a partition plate, and is preferably composed of two or more reaction chambers in that it is possible to efficiently obtain a polylactic acid resin having a high molecular weight.

There is no particular limitation on the method in which the prepolymer formed in the melt polymerization step is take out from the reaction vessel after completion of the reaction, and examples thereof include a method of taking out by extrusion with an inert gas such as nitrogen, a method of taking out by a gear pump, and the like. In view of handling properties of a low viscosity prepolymer, the method is preferably a method of taking out by extrusion with an inert gas such as nitrogen.

Next, the crystallization step will be described. The prepolymer obtained in the melt polymerization step is in an amorphous state since no crystal melting enthalpy is observed. The prepolymer cannot be subjected to solid phase polymerization since it is fused when heated in the amorphous state. Therefore, a crystallization treatment of the prepolymer is performed after the melt polymerization step and before initiation of the solid phase polymerization step to obtain a crystallized prepolymer.

Examples of the method of the crystallization treatment include, but are not limited to; a method in which a heat treatment is performed in a gas phase such as nitrogen or air, or a liquid phase such as water or ethanol at a crystallization treatment temperature; a method in which a prepolymer is dissolved in a solvent to form a solution, followed by vaporization of the solvent; a method in which a prepolymer is brought into contact with a solvent; a method in which a shear and/or a pressure is/are applied in a state where a prepolymer is melted; and the like. The method is preferably a method in which shear and/or pressure is/are applied in a state where a prepolymer is melted in that it is possible to crystallize until the objective crystal melting enthalpy in a short time.

The method in which shear and/or pressure is/are applied in a state where a prepolymer is melted is preferably a method in which a prepolymer is retained in a melting machine under applied shear and/or pressure. The prepolymer obtained in the melt polymerization step may be charged in a melting machine in a molten state without causing solidification, followed by application of shear and/or pressure, or the prepolymer obtained in the melt polymerization step may be once solidified and charged in a melting machine, followed by remelting and further application of shear and/or pressure. It is preferred that the prepolymer obtained in the melt polymerization step is charged in a melting machine, followed by application of shear and/or pressure in that the step can be simplified.

The melting machine is not limited as long as it can apply shear or pressure, and it is possible to use a polymerization tank, a kneader, a Banbury mixer, a single screw extruder, a twin screw extruder, an injection molding machine, and the like. The melting machine is preferably a single screw extruder or a twin screw extruder.

The temperature in the case of crystallizing is preferably from 70° C. to 140° C., more preferably from a melting point 80° C. to 140° C., still more preferably from 90° C. to 135° C., and particularly preferably from 100° C. to 130° C. in that it is possible to crystallize until reaching the objective crystal melting enthalpy in a short time. The temperature of the melting machine is usually set at a melting point +20° C. or higher so that a resin is melted to exhibit satisfactory fluidity. It is not preferred to retain at a temperature higher than 140° C. since the resin is remelted even when a crystal is formed. It is not preferred to crystallize at a temperature lower than 70° C. since excessive proceeding of crystallization may cause an increase in a crystal melting enthalpy to more than 50 J/g of the obtained crystallized prepolymer, resulting in deterioration of solid phase polymerizability.

The retention time of the prepolymer in the melting machine is preferably from 0.5 minute to 10 minutes, more preferably from 0.5 minute to 5 minutes, and particularly preferably from 0.5 minute to 3 minutes. It is not preferred that the retention time is less than 0.5 minute since insufficient crystallization may occur. It is not also preferred that the retention time is more than 10 minutes since retention may be likely to cause decomposition of the resin.

Application of shear upon retention may cause molecular orientation of a molten resin, thus enabling remarkably rapid crystallization, preferably. At this time, a shear rate is preferably in a range from 10 to 400/second. It is not preferred that the shear rate is less than 10/second since the crystallization rate may decrease. It is not preferred that the shear rate is more than 400/second, the resin temperature may increase due to shear heating, and thus thermal decomposition is likely to occur.

Application of pressure upon retention may accelerate crystallization of a molten resin, thus enabling formation of a crystallized prepolymer having both satisfactory fluidity and crystallinity when the pressure is particularly in a range from 0.05 to 10 MPa, preferably. It is not preferred that the pressure is less than 0.05 MPa and more than 10 MPa since the crystallization rate may decrease.

It is particularly preferred to simultaneously satisfy the shear rate of 10 to 400/second and the pressure of 0.05 to 10 MPa since the crystallization rate may more increase.

The crystallized prepolymer thus produced can be pelletized by an underwater cutter or a hot cutter after discharging from the melting machine. It is also possible to pelletize by a strand cutter after the crystallized prepolymer was discharged, formed into a strand and then cooled.

As mentioned above, after completion of the melt polymerization step, the prepolymer is crystallized by applying shear and/or pressure under specific temperature conditions, and thus a crystallized prepolymer can be easily obtained even in the case of a prepolymer with a low crystallization rate to obtain pellets which are excellent in solid phase polymerizability and have high degree of crystallinity.

Next, the solid phase polymerization step will be described. The solid phase polymerization step is preferably performed at a temperature of a melting point or lower of a crystallized prepolymer. The solid phase polymerization step is preferably performed at a temperature of 70 to 155° C. in that it is possible to efficiently obtain a polylactic acid resin which has a high molecular weight and is also excellent in color hue, more preferably 80 to 155° C., and still more preferably 90 to 150° C. Particularly, a final temperature of the solid phase polymerization step is preferably from 130 to 155° C., and more preferably from 140 to 150° C. It is not preferred that the solid phase polymerization temperature is lower than 70° C. since polymerization activity is insufficient and solid phase polymerization slowly proceeds, leading to a decrease in productivity. It is not preferred that the solid phase polymerization temperature is higher than 155° C. since pellets are likely to be fused due to melting of a crystal, leading to a decrease in yield.

The solid phase polymerization step may be performed either under a single stage temperature condition, or a two- or higher multi-stage temperature condition. The solid phase polymerization step may be performed under a two- or higher multi-stage temperature condition in that an increase in molecular weight is easily achieved in a short time and also color hue is excellent, and more preferably the temperature is stepwisely changed as the reaction proceeds. A temperature rise width between the respective stages is preferably 15° C. or lower, more preferably 10° C. or lower, and still more preferably 5° C. or lower. In case the solid phase polymerization is performed in a multi-stage, it is preferred that the solid phase polymerization is continuously performed under conditions including at least two stages of the condition at 70° C. to 140° C. and the condition at 140° C. to 155° C. in that fusion of pellets does not occur and the solid phase polymerization efficiently proceeds, thus obtaining a high molecular weight polylactic acid resin.

The solid phase polymerization step is preferably performed for a reaction time of 1 to 100 hours in that it is possible to efficiently obtain a polylactic acid resin which has a high molecular weight and a high melting point, and is also excellent in drawdown resistance and hydrolysis resistance. The solid phase polymerization step is preferably performed for a reaction time of 3 to 80 hours in that it is possible to efficiently obtain a polylactic acid resin which is also excellent in color hue, more preferably 5 to 50 hours, and still more preferably 10 to 30 hours.

In case the solid phase polymerization step is performed under a multi-stage temperature condition, for example, it is possible to exemplify a method in which a first stage is performed at a temperature of 70 to 140° C. for 1 to 50 hours, and then a second stage is performed at a temperature of 140 to 155° C. for 1 to 50 hours. It is more preferred that a first stage is performed at a temperature of 70 to 140° C. for 5 to 30 hours and a second stage is performed at a temperature of 140 to 150° C. for 5 to 60 hours, and then a third stage is performed at a temperature of 150 to 155° C. for 10 to 60 hours in that an increase in molecular weight is easily achieved in a short time and also color hue is excellent. Even when the solid phase polymerization step is performed under a multi-stage temperature condition, the total of the reaction time of the solid phase polymerization step is preferably from 1 to 100 hours.

Regarding the temperature condition of the solid phase polymerization step, the temperature may be continuously raised in place of using a multi-stage temperature rising method in which a temperature is maintained at a given temperature in each stage as mentioned above. For example, it is possible to exemplify a method in which a temperature is raised from 110° C. to 150° C. over 20 hours at a rate of 2° C. per hour, and then the temperature is maintained at 150° C. In case the temperature is continuously raised, a temperature rise rate is preferably 10° C. or lower per hour.

The pressure condition of the solid phase polymerization step is not particularly limited, and may be any of reduced pressure condition, normal pressure condition and elevated pressure condition. The pressure condition is preferably reduced pressure condition or normal pressure condition in that it is possible to efficiently obtain a polylactic acid resin having a high molecular weight. In case the solid phase polymerization step is performed under reduced pressure condition, the solid phase polymerization step is preferably performed under a pressure of 0.13 to 1,300 Pa. The solid phase polymerization step is preferably performed under a pressure of 1 to 1,000 Pa, more preferably 10 to 900 Pa, still more preferably 100 to 800 Pa, and particularly preferably 500 to 700 Pa. The solid phase polymerization step may be performed either under a single stage pressure conditions or a two- or higher multi-stage pressure condition, preferably a multi-stage pressure condition. For example, it is possible to exemplify in which a reaction is performed under a pressure of 700 to 1,300 Pa, and then a reaction is performed under a pressure of 0.13 to 700 Pa. A reaction is preferably performed in a flow of an inert gas such as dry nitrogen, and a flow rate is preferably from 0.01 to 200 L/minute, more preferably 0.1 to 150 L/minute, and particularly preferably from 0.5 to 100 L/minute, per 1 kg of a prepolymer.

The shape of a crystallized prepolymer used in the solid phase polymerization step is not particularly limited and may be any of a massive lump, a film, a pellet and a powder, and preferably a pellet or a powder. The pellet refers to a crystallized prepolymer having a spherical shape, a prolate spheroidal shape, a shallow spherical shape, a plate-shape, a bar-shape, a shape close thereto, an amorphous shape, and other arbitrary shapes, each having a maximum diameter of about 1 to 10 mm, especially about 1.2 to 8 mm, and mostly about 1.5 to 6 mm. The pellet is also called a chip as another name. In the case of a powder, an average particle diameter is preferably from 0.01 to 5 mm, and more preferably from 0.1 to 1 mm in that it is possible to efficiently perform solid phase polymerization. A pellet shape is particularly excellent in productivity in case the solid phase polymerization is performed, and exerts high effect.

The solid phase polymerization step may be performed by either a batch method or a continuous method. It is possible to use, as a reaction vessel, a stirring vessel type reaction vessel, a mixer type reaction vessel, and a column type reaction vessel, and two or more kinds of these reaction vessels can be used in combination. In view of productivity, the solid phase polymerization step is preferably performed by a continuous method.

The polylactic acid resin of an embodiment of the present invention obtained by the solid phase polymerization step has an optical purity (Eb) in a range from 60 to 94%, more preferably from 70 to 92% in view of excellent melt processability, still more preferably from 80 to 92% in view of excellent appearance of a molded article, and particularly preferably from 84 to 92%. It is not preferred that the optical purity is less than 60% since hydrolysis resistance may deteriorate. It is not preferred that the optical purity is more than 94% since it is necessary to increase a molding temperature upon melt processing, and thus poor appearance of a molded article is likely to occur.

The optical purity (Eb) is the value to be determined from L-lactic acid content l and D-lactic acid content d in the entire lactic acid component, measured using liquid chromatography after hydrolyzing the crystallized prepolymer into a monomer unit, through the following equation (A).

$$Eb=|l-d|/(l+d)\times100(\%) \quad (A).$$

When the polylactic acid resin is poly-L-lactic acid, it preferably includes 3 mol % or more and 20 mol % or less, more preferably 4 mol % or more and 15 mol % or less, still more preferably 4 mol % or more and 10 mol % or less, and particularly preferably 4 mol % or more and 8 mol % or less of a D-lactic acid unit.

When the polylactic acid resin is poly-D-lactic acid, it preferably includes 3 mol % or more and 20 mol % or less, more preferably 4 mol % or more and 15 mol % or less, still more preferably 4 mol % or more and 10 mol % or less, and particularly preferably 4 mol % or more and 8 mol % or less of an L-lactic acid unit.

The polylactic acid resin of the present invention is preferably a copolymer composed of an L-lactic acid unit and a D-lactic acid unit, each having the above-mentioned preferred content, or may also be a mixture of a poly-L-lactic acid and a poly-D-lactic acid.

The weight average molecular weight of the polylactic acid resin of the present invention is preferably in a range from 150,000 to 300,000 in view of excellent mechanical properties, more preferably from 180,000 to 300,000 in view of excellent moldability and mechanical properties, and still more preferably from 200,000 to 300,000 in view of excellent moldability, mechanical properties and drawdown resistance. It is not preferred that the weight average molecular weight is less than 150,000 since mechanical properties are inferior and also drawdown resistance deteriorates.

The polylactic acid resin of an embodiment of the present invention has molecular weight distribution of 2.2 or more, preferably 2.4 or more in view of suppression of drawdown, still more preferably 2.6 or more, and yet more preferably 2.8 or more. The upper limit of molecular weight distribution is not particularly limited and is preferably 5 or less in view of excellent melt processability and productivity, and more preferably 4 or less. It is preferred that molecular weight distribution is in the above range since it is possible to obtain polylactic acid resin which is excellent in drawdown resistance and hydrolysis resistance. A weight average molecular weight and a number average molecular weight are the values of standard polymethyl methacrylate-equivalent weight average molecular weight and number average molecular weight of a prepolymer and a polylactic acid resin were determined by the measurement through gel permeation chromatography (GPC) using hexafluoroisopropanol as a solvent. Molecular weight distribution is a ratio of a weight average molecular weight to a number average molecular weight.

In the present invention, it is possible to obtain a polylactic acid resin having an optical purity (Eb), a weight average molecular weight and molecular weight distribution, each being in the above-mentioned preferred range, by solid phase polymerization of a crystallized prepolymer having a specific optical purity (Ea), weight average molecular weight and crystal melting enthalpy ($\Delta Hma$), each being in the above-mentioned preferred range.

The melting point (Tm), which is observed in the 1st Run when a temperature is raised from 30° C. to 200° C. at a temperature rise rate of 20° C./minute using a differential scanning calorimeter, of the polylactic acid resin is preferably in a range from 150 to 190° C. in that melt processability is excellent and appearance of a molded article becomes satisfactory, and more preferably from 160 to 180° C. It is not preferred that the polylactic acid resin has a melting point of lower than 150° C. since a crystal is partially melted upon solid phase polymerization and pellets are likely to be fused, leading to a decrease in yield. It is not preferred that a polylactic acid resin has a melting point of higher than 190° C. since it is necessary to increase a molding temperature upon melt processing and thus poor appearance of a molded article is likely to occur.

A crystal melting enthalpy ($\Delta Hmb$), which is observed in the 1st Run when a temperature is raised from 30° C. to 200° C. at a temperature rise rate of 20° C./minute using a differential scanning calorimeter, of the polylactic acid resin is preferably in a range from 60 to 98 J/g in view of excellent hydrolysis resistance, and more preferably from 65 to 90 J/g. It is not preferred that $\Delta Hmb$ is less than 60 J/g since hydrolysis resistance is inferior. It is possible to obtain a polylactic acid resin, which has a high molecular weight and is excellent in hydrolysis resistance and melt processability, even when the polylactic acid resin has a low optical purity by adjusting the melting point and $\Delta Hmb$ of polylactic acid resin in the above range.

A specific method for the measurement of a crystal melting enthalpy ($\Delta Hmb$) is as follows. A crystal melting enthalpy, which is observed in the 1st Run when a temperature of 10 mg of a sample is raised from 30° C. to 200° C. at a temperature rise rate of 20° C./minute using a differential scanning calorimeter (DSC7) manufactured by PERKIN ELMER, Inc., of a crystallized prepolymer was designated as Tm, and a crystal melting enthalpy was designated as $\Delta Hmb$.

The polylactic acid resin preferably satisfies the inequality expression (2), more preferably the inequality expression (6), and still more preferably the inequality expression (7) in that high hydrolysis resistance and melt processability are obtained.

$$(\Delta Hmb-\Delta Hmc)>50(J/g) \quad (2)$$

$$(\Delta Hmb-\Delta Hmc)>60(J/g) \quad (6)$$

$$(\Delta Hmb-\Delta Hmc)>70(J/g) \quad (7)$$

A crystal melting enthalpy of a polylactic acid resin, which is observed in the 2nd Run when a temperature of a sample is raised from 30° C. to 200° C. at a rate of 20° C./minute and is maintained at 200° C. for 5 minutes, followed by temperature falling from 200° C. to 30° C. at a temperature fall rate of 20° C./minute, maintaining at 30° C. for 1 minute and further temperature rising from 30° C. to 200° C. at a temperature rise rate of 20° C./minute, was designated as $\Delta Hmc$.

The present inventors have also found that preferable range of the crystal melting enthalpy ($\Delta Hmb$) of the polylactic acid resin is influenced by the optical purity (Eb (%)) of the polylactic acid resin. Namely, a relation between the crystal melting enthalpy ($\Delta Hmb$) and the optical purity (Eb (%)) preferably satisfies the inequality expression (3) in view of excellent crystallinity, more preferably the inequality expression (8), and still more preferably the inequality expression (9) in view of excellent hydrolysis resistance.

$$\Delta Hmb(J/g)+0.25(100-Eb(\%))\geq 60 \quad (3)$$

$$\Delta Hmb(J/g)+0.25(100-Eb(\%))\geq 65 \quad (8)$$

$$\Delta Hmb(J/g)+0.25(100-Eb(\%))\geq 70 \quad (9)$$

In order to obtain a polylactic acid resin having excellent thermostability, a stabilizer is preferably added upon initiation of the melt polymerization step, during the melt polymerization step, or after completion of the solid phase polymerization.

Examples of the stabilizer include a sulfur-containing compound containing sulfur having an oxidation number of less than +5, a phosphorus compound, an aromatic ketone compound, a hydrocarbon compound having an aromatic ring, an aliphatic dicarboxylic acid, aliphatic diol, an alicyclic hydrocarbon compound, hindered phenols, vitamins, triazoles, hydrazine derivative, and the like, and a plurality of these stabilizers may be used. It is preferred to contain at least one selected from among a sulfur-containing compound containing sulfur having an oxidation number of less than +5, a phosphorus compound, an aromatic ketone compound, a hydrocarbon compound having an aromatic ring, an aliphatic dicarboxylic acid, an aliphatic diol and an alicyclic hydrocarbon compound. The sulfur-containing compound containing sulfur having an oxidation number of less than +5 is preferably diphenylsulfone, sulfurous acid, sodium sulfite, sulfur, or "Sumilizer (registered trademark)" TPD (pentaerythritoltetrakis($\beta$-lauryl-thio-propionate)) manufactured by Sumitomo Chemical Co., Ltd. Of these phosphorus compounds, an inorganic phosphorus compound is preferably a phosphoric acid compound or a phosphorous acid compound. The organic phosphorus compound is preferably a phosphate compound or a phosphite compound. Preferable specific examples of the inorganic phosphorus compound include phosphoric acid, phosphorous acid, sodium phosphate, and sodium phosphate; and preferable specific examples of the organic phosphorus compound include "Adekastab (registered trademark)" AX-71 (dioctadecylphosphate), PEP-8 (distearylpentaerythritol diphosphite), PEP-36 (cyclic neopentatetraylbis(2,6-t-butyl-4-methylphenyl)phosphite), HP-10 (2,2'-methylenebis(4,6-di-t-butyl-1-phenyloxy)(2-ethylhexyloxy)phosphorus), PEP-24G (bis(2,4-di-t-butylphenyl)pentaerythritol diphosphite), 3010 (triisodecyl phosphite), and TPP (triphenyl phosphite) manufactured by ADEKA CORPORATION; "Irgafos (registered trademark)" 168 (tris(2,4-di-t-butylphenyl)phosphite) manufactured by Ciba Specialty Chemicals; and Limited HCA (9,10-dihydro-9-oxa-10-phosphaphenanthrene-10-oxide) manufactured by SANKO Company. The inorganic phosphorus compound is preferably a phosphorus compound in which a phosphorus atom is directly bonded to carbon atoms constituting an aromatic ring, and particularly preferably HCA (9,10-dihydro-9-oxa-10-phosphaphenanthrene-10-oxide) manufactured by SANKO Company Limited. The aromatic ketone compound is particularly preferably 1,4-dibenzoylbenzene or benzophenone. The hydrocarbon compound having an aromatic ring is preferably triphenylmethane, the aliphatic dicarboxylic acid is preferably oxalic acid, the aliphatic diol is preferably hexanediol, and the alicyclic hydrocarbon compound is particularly preferably 1,2-dimethylcyclohexane.

The addition amount of the stabilizer is not particularly limited and is preferably from 0.001 to 2 parts by weight, more preferably from 0.01 to 1 part by weight, still more preferably from 0.05 to 0.5 part by weight, and most preferably from 0.08 to 0.3 part by weight, based on 100 parts by weight of the polylactic acid resin in view of excellent thermostability. There is no particular limitation on timing of the addition of the stabilizer, and the stabilizer may be added upon initiation or after completion of each of the melt polymerization step and solid phase polymerization step. The stabilizer is preferably added in the melt polymerization step in that it is possible to obtain a high molecular weight polylactic acid resin.

It is also preferred to add the stabilizer after completion of the solid phase polymerization step in that it is possible to obtain a polylactic acid resin having excellent thermostability. In that case, the method of adding a stabilizer is not particularly limited, and examples thereof include a method in which a polylactic acid resin and a stabilizer are melt-kneaded, a method in which a stabilizer is dissolved in a solvent, followed by mixing and further removal of the solvent, and the like. The method is preferably a method in which a polylactic acid resin and a stabilizer are melt-kneaded in that it is possible to efficiently produce. The melt-kneading method may be either a batch method or a continuous method. It is possible to use, as an apparatus, a single screw extruder, a twin screw extruder, a multi-screw extruder, a plastomill, a kneader, a stirring type reactor equipped with a pressure reducing device, and the like. It is preferred to use single screw extruder or a twin screw extruder in that it is possible to knead efficiently and uniformly. The temperature at which the stabilizer is added is preferably from 160 to 200° C., and more preferably from 170 to 190° C. in view of excellent mechanical properties. The pressure at which the stabilizer is added may be any of reduced pressure, normal pressure and elevated pressure, and preferably reduced pressure in that a gas generated can be removed upon melt-kneading. Regarding atmospheric conditions upon melt-kneading, either atmosphere, or atmosphere of an inert gas such as nitrogen may be used. Melt-kneading is preferably performed under inert gas atmosphere in that it is possible to reduce the amount of a gas generated upon melt-kneading.

In the case of mixing in a solvent, a solvent capable of dissolving a polymer and a monomer is used. It is possible to use, as the solvent, for example, chloroform, methylene chloride, acetonitrile, and the like. There is no particular limitation on the method in which the solvent is removed in case the solvent must be removed after mixing. For example, it is possible to use a method in which a solvent is vaporized at room temperature, and a method in which a solvent is vaporized under reduced pressure at a boiling point or higher of the solvent.

To the polylactic acid resin of the present invention, fillers and other additives can be added as long as the feature of the present invention is not impaired. There is no particular limitation on the filler, and it is possible to use any filler, for example, fibrous, tubular, powdered and granular fillers. Specifically, it is possible to use, as the filler, fibrous fillers such as glass fiber, carbon fiber, potassium titanate whisker, zinc oxide whisker, calcium carbonate whisker, wollastonite whisker, aluminum borate whisker, aramid fiber, alumina fiber, silicon carbide fiber, ceramic fiber, asbestos fiber, gypsum fiber, and metal fiber; silicic acid salts such as talc, wollastonite, zeolite, sericite, mica, kaolin, clay, pyrophyllite, bentonite, asbestos, and alumina silicate; metal oxides such as silicon oxide, magnesium oxide, alumina, zirconium hydroxide, titanium oxide, and iron oxide; carbonates such as calcium carbonate, magnesium carbonate, and dolomite, and metal sulfates such as calcium sulfate and barium sulfate; metal hydroxides such as glass beads, ceramic beads, boron nitride, silicon carbide, calcium phosphate, calcium hydroxide, magnesium hydroxide, and aluminum hydroxide; non-fibrous fillers such as glass flake, glass powder, carbon black and silica, and graphite; smectite-based clay minerals such as montmorillonite, beidellite, nontronite, saponite, hectorite, and sauconite; various clay minerals such as vermiculite, halloysite, kanemite, kenyaite, zirconium phosphate, and titanium phosphate; layered silicates represented by swellable mica such as Li type fluorotaeniolite, Na type fluorotaeniolite, Na type tetracyclic fluoromica, and Li type tetracyclic fluoromica; and the like.

Examples of other additives include antioxidants (for example, phosphorous-based antioxidants, hindered phenol-based antioxidants), ultraviolet absorbers (for example, resorcinol, salicylate), coloration inhibitors (phosphite, hypophosphite, etc.), lubricants and mold releasants (stearic acid, montanoic acid and a metal salt thereof, an ester thereof, a half ester thereof, stearyl alcohol, stearamid and polyethylene wax, etc.), colorants (dyes, pigments, etc.), carbon black as conductant agents or colorants, nucleating agents, plasticizers, flame retardants (bromine-based flame retardants, phosphorus-based flame retardants, red phosphorus, silicone-based flame retardants, etc.), flame-retardant auxiliaries, and antistatic agents.

The polylactic acid resin of the present invention can be mixed with other resins as long as the object of the present invention is not impaired. It is possible to use, as other resins, for example, at least one selected from thermoplastic resins such as polyethylene, polypropylene, an acrylic resin, a styrene resin, polyamide, a polyphenylene sulfide resin, a polycarbonate resin, a polyether ether ketone resin, polyester, polysulfone, polyphenylene oxide, polyacetal, polyimide, and polyetherimide; thermosetting resins such as a phenol resin, a melamine resin, a polyester resin, a silicone resin, and an epoxy resin; or soft thermoplastic resins such as an ethylene/glycidyl methacrylate copolymer, a polyester elastomer, a polyamide elastomer, an ethylene/propylene terpolymer, and an ethylene/butene-1 copolymer.

The polylactic acid resin composition obtained by the production method of the present invention has a high molecular weight even after hot-melting and further solidification in the case of being processed into a molded article, and it is easy to form a polylactic acid resin which is excellent in drawdown resistance upon melt processing.

The polylactic acid resin composition of the present invention can be widely used for a molded article. Examples of the molded article include films, sheets, fibers/cloths, nonwoven fabrics, injection molded articles, extrusion molded articles, vacuum/pressure molded article, blow molded articles, and composites with other materials, and these molded articles are useful for agricultural materials, horticultural materials, fishery materials, building/construction materials, stationeries, medical supplies, automotive parts, electrical and electronic parts, or other applications. The polylactic acid resin composition of the present invention is particularly suited for being processed into a film or a sheet.

Embodiments of the present invention will be specifically described by way of Examples. In Examples, parts are by weight.

(1) Weight Average Molecular Weight, Number Average Molecular Weight, Molecular Weight Distribution The values of standard polymethyl methacrylate-equivalent weight average molecular weight and number average molecular weight of a prepolymer and a polylactic acid resin were determined by the measurement through gel permeation chromatography (GPC). Molecular weight distribution is the value represented by a ratio of a weight average molecular weight to a number average molecular weight. The measurement through GPC was performed using a differential refractometer WATERS410 manufactured by WATERS Corporation as a detector, a high-performance liquid chromatography MODEL510 as a pump, and a column in which Shodex GPC HFIP-806M and Shodex GPC HFIP-LG are connected in series. Under measurement conditions of a flow rate of 0.5 mL/minute, the measurement was performed by injecting 0.1 mL of a solution having a sample concentration of 1 mg/mL as a measurement sample prepared using hexafluoroisopropanol as a solvent.

(2) Optical Purity (E)

An optical purity of each of a prepolymer and a polylactic acid resin was determined in the following manner. A measurement sample was hydrolyzed in a mixed solvent of an aqueous 1N sodium hydroxide solution and methanol at 60° C. for 5 hours. The obtained monomer solution was neutralized with 1N hydrochloric acid and then diluted with an aqueous 0.5 g/L copper sulfate solution to obtain a solution having a sample concentration of 0.4 mg/mL. From L-lactic acid content 1 and D-lactic acid content d obtained by the measurement of the obtained solution through a high-performance liquid chromatography (HPLC) with an optical resolution column attached thereto, an optical purity (E) represented by the following equation (A) was determined.

$$E = |l-d|/(l+d) \times 100 (\%) \quad (A)$$

The measurement of HPLC was performed by using ultra-high speed LC Nexera manufactured by Shimadzu Corporation, and using SUMICHIRAL OA-6100 manufactured by Sumika Chemical Analysis Service, Ltd. as an optical resolution column. Under measurement conditions of a flow rate of 0.5 mL/min, an aqueous 0.5 g/L copper sulfate solution was used as a mobile phase solvent and ultrapure water was used as a sampler cleaning solvent.

(3) Solid Phase Polymerizability

A weight average molecular weight of a polylactic acid resin obtained by solid phase polymerization was measured by the above-mentioned method (1). The case where the weight average molecular weight is 150,000 or more was rated "A", and the case where the weight average molecular weight is less than 150,000 was rated "B".

(4) Fusibility of Pellets

A state of polylactic acid resin pellets obtained by solid phase polymerization was visually confirmed. The case where fusion did not occur after solid phase polymerization was rated "A", and the case where fusion occurred after solid phase polymerization was rated "B".

(5) Heat Characteristic

Using a differential scanning calorimeter (DSC7) manufactured by PERKIN ELMER, Inc., heat characteristic of each of a prepolymer and a polylactic acid resin was measured. A crystal melting enthalpy, determined when a temperature of 10 mg of a sample was raised from 30° C. to 200° C. at a rate of 20° C./minute in nitrogen atmosphere, of a crystallized prepolymer was designated as $\Delta Hma$. A crystal melting temperature of a polylactic acid resin measured in the same manner was designated as Tm, and a crystal melting enthalpy was designated as $\Delta Hmb$. After measuring the crystal melting enthalpy $\Delta Hmb$, a crystal melting enthalpy, determined in the case of subsequently maintaining a temperature at 200° C. for 5 minutes, followed by temperature falling from 200° C. to 30° C. at a temperature fall rate of 20° C./minute, and further temperature rising from 30° C. to 200° C. at a temperature rise rate of 20° C./minute, of a polylactic acid resin was designated as $\Delta Hmc$.

(6) Hydrolysis Resistance

Using a constant temperature and humidity chamber manufactured by ESPEC CORP., 50 mg of a polylactic acid resin after subjecting to solid phase polymerization was allowed to undergo a heat-moisture treatment under the conditions of a temperature of 60° C. and a relative humidity of 95% for 24 hours, and then a weight average molecular weight of the polylactic acid resin before and after the treatment was measured by the above-mentioned method (1). The case where weight average molecular weight retention of the polylactic acid resin after the treatment, based on the weight average molecular weight of the polylactic acid resin before the treatment, is 95% or more was rated "A", the case where weight average molecular weight retention is less than 95% to 85% or more was rated "B", the case where weight average molecular weight retention is less than 85% to 75% or more was rated "C", and the case where weight average molecular weight retention is less than 75% was rated "D".

(7) Moldability 1

Using a single screw extruder (30 mmφ) equipped with a T-die measuring 100 mm in die width and 1 mm in lip width, and a first roll having a surface temperature of 50° C., a second roll having a surface temperature of 60° C. and a third roll having a surface temperature of 40° C. as cooling rolls, a polylactic acid resin was subjected to extrusion molding at a cylinder temperature of 210° C., a screw speed of 80 rpm, a T-die temperature of 210° C., an extrusion rate of 1 m/minute, and a take-up rate of 1 m/minute to produce a sheet. The case where the obtained sheet has a smooth surface was rated "A", the case where the obtained sheet has unevenness on a surface was rated "B", and the case where the obtained sheet has unevenness and tear on a surface was rated "C".

(8) Drawdown Resistance

Using a vacuum molding machine, a sheet obtained in (7) was heated under the conditions of a heating temperature of 100° C., and a heating time of 60 seconds, and then the sheet was closely adhered to a mold at a mold temperature of 40° C. and, at the same time, the pressure inside the mold was reduced to obtain a columnar container measuring 6 cm in inner diameter and 10 cm in depth. The case where a sheet scarcely causes drawdown was rated "A", the case where a sheet causes slight drawdown, but can be molded was rated "B", the case where a sheet causes drawdown, but can be barely molded was rated "C", and the case where a sheet causes drawdown and cannot be molded was rated "D".

(9) Moldability 2

Using a single screw extruder (57 mmφ) equipped with a T-die measuring 300 mm in die width and 0.5 mm in lip width, and a first roll having a surface temperature of 50° C., a second roll having a surface temperature of 60° C. and a third roll having a surface temperature of 40° C. as cooling rolls, a polylactic acid resin was subjected to extrusion molding at a screw speed of 80 rpm, a predetermined molding temperature (cylinder temperature, T-die temperature), an extrusion rate of 1 m/minute, and a take-up rate of 1 m/minute to produce a sheet. The case where a sheet was obtained was rated "A", and the case where a sheet was not obtained was rated "B".

(10) Appearance of Molded Article

The case where a sheet obtained in (9) has satisfactory appearance was rated "A", and the case where wrinkles are observed in a sheet was rated "B".

Production Example 1

In a reaction vessel equipped with a stirrer and a reflux condenser, 97 parts of an aqueous 90% L-lactic acid solution and 3 parts of an aqueous 90% D-lactic acid solution were charged. After adjusting the temperature of the reaction vessel to 150° C., the pressure was adjusted to 800 Pa by gradually reducing the pressure in the system, and then a reaction was performed for 3.5 hours while removing water. Thereafter, 0.08 part of tin (II) acetate and 0.22 part of methanesulfonic acid were added as catalysts, and then a polymerization reaction was performed at a temperature of 170° C. and a pressure of 400 Pa for 6 hours to obtain a prepolymer (A-1) having Mw of 23,000 and an optical purity of 92%.

Production Example 2

In the same manner as in Production Example 1, except that the aqueous lactic acid solution to be used was changed to 95 parts of an aqueous 90% L-lactic acid solution and 5 parts of an aqueous 90% D-lactic acid solution, a prepolymer (A-2) having Mw of 21,000 and an optical purity of 88%.

Production Example 3

In the same manner as in Production Example 1, except that the polymerization temperature after dehydration was changed to 200° C. and the polymerization time was changed to 15 hours, a prepolymer (A-3) having Mw of 42,000 and an optical purity of 82% was obtained.

Production Example 4

In the same manner as in Production Example 1, except that the polymerization temperature after dehydration was changed to 200° C. and the polymerization time was changed to 25 hours, a prepolymer (A-4) having Mw of 65,000 and an optical purity of 76% was obtained.

Production Example 5

In the same manner as in Production Example 1, except that the aqueous lactic acid solution to be used was changed to 88 parts of an aqueous 90% L-lactic acid solution and 11 parts of an aqueous 90% D-lactic acid solution, and the polymerization time after dehydration was changed 2 hours, a prepolymer (A-5) having Mw of 3,000 and an optical purity of 76% was obtained.

Production Example 6

In the same manner as in Production Example 1, except that the aqueous lactic acid solution to be used was changed to 93 parts of an aqueous 90% L-lactic acid solution and 7 parts of an aqueous 90% D-lactic acid solution, and the polymerization time after dehydration was changed 60 hours, a prepolymer (A-6) having Mw of 104,000 and an optical purity of 82% was obtained.

Production Example 7

In the same manner as in Production Example 1, except that the aqueous lactic acid solution to be used was changed to 100 parts of an aqueous 90% L-lactic acid, a prepolymer (A-7) having Mw of 20,000 and an optical purity of 98% was obtained.

Production Example 8

In the same manner as in Production Example 1, except that the aqueous lactic acid solution to be used was changed to 78 parts of an aqueous 90% L-lactic acid solution and 22 parts of an aqueous 90% D-lactic acid solution, a prepolymer (A-8) having Mw of 25,000 and an optical purity of 54% was obtained.

Example 1

The prepolymer obtained in Production Example 1 was crystallized by using a TEX30 type twin screw extruder (L/D=45.5) manufactured by The Japan Steel Works, Ltd. A plasticization section set at a temperature of 160° C. was provided at a section of L/D=10 from a resin supply inlet of the extruder, and a crystallization section set at a temperature shown in Table 1 was provided at a section of L/D=35.5 from the plasticization section. A screw element of the crystallization section was provided with a kneading block having a length of L/D=4 using a plurality of kneading disks in combination at two positions to give a screw capable of applying shear.

The prepolymer was supplied to the resin supply inlet of the extruder and crystallized under the conditions shown in Table 1 and, after cooling the crystallized prepolymer discharged in the form of a strand through a discharge hole of the extruder, the crystallized prepolymer was pelletized by a strand cutter. The weight average molecular weight, the optical purity and the crystal melting enthalpy of the obtained pellets of the crystallized prepolymer are as shown in Table 1. Subsequently, the obtained pellets of the crystallized prepolymer were continuously heated from 110° C. to 150° C. over 20 hours under a pressure of 50 Pa (temperature rise rate of 2° C. per hour) and then subjected to solid phase polymerization at 150° C. for 40 hours. The weight average molecular weight of the obtained polylactic acid resin is shown in Table 1.

sufficiently proceed. In Comparative Example 4, since the prepolymer has too low optical purity, the prepolymer was not crystallized even when shear was applied and thus solid phase polymerization scarcely proceeded. In Comparative Example 5, since weak shear was applied to the prepolymer in the crystallization step and the crystal melting enthalpy (ΔHma) of the crystallized prepolymer is less than 4 J/g, that is, crystallization did not sufficiently occur, resulting in low solid phase polymerizability. In Comparative Example 6 and Comparative Example 7, since the crystal melting enthalpy (ΔHma) of the crystallized prepolymer exceeded 50 J/g, the molecular weight reached the limit, resulting in low solid phase polymerizability. Comparing Example 1 with Example 5, Example 1, which is an aspect with more preferable crystal melting enthalpy (ΔHma), exhibited high solid phase polymerizability.

TABLE 1

|  |  |  | Example | | | | | | | | |
|---|---|---|---|---|---|---|---|---|---|---|---|
|  |  |  | 1 | 2 | 3 | 4 | 5 | 6 | 7 | 8 |
|  | Prepolymer |  | A-1 | A-1 | A-1 | A-1 | A-1 | A-2 | A-3 | A-4 |
| Crystallization conditions | Plasticization temperature | ° C. | 160 | 145 | 140 | 140 | 140 | 160 | 160 | 160 |
|  | Crystallization temperature | ° C. | 120 | 110 | 110 | 100 | 90 | 110 | 90 | 80 |
|  | Shear rate | 1/second | 150 | 50 | 150 | 150 | 150 | 150 | 150 | 150 |
|  | Retention time | Minute | 1 | 1 | 1 | 1 | 2 | 1 | 1 | 1 |
| Crystallized prepolymer | Weight average molecular weight | ×10,000 | 2.3 | 2.3 | 2.3 | 2.3 | 2.3 | 2.1 | 4.2 | 6.5 |
|  | Optical purity | % | 92 | 92 | 92 | 92 | 92 | 88 | 82 | 76 |
|  | Crystal melting enthalpy ΔHma | J/g | 33 | 29 | 38 | 41 | 47 | 28 | 30 | 34 |
|  | ΔHma (J/g) + (100 − Ea(%))/2 |  | 37 | 33 | 42 | 45 | 51 | 34 | 39 | 46 |
| Solid phase polymerization conditions | Final polymerization temperature | ° C. | 150 | 150 | 150 | 150 | 150 | 150 | 150 | 150 |
|  | Polymerization time | hour | 60 | 60 | 60 | 60 | 60 | 60 | 60 | 60 |
| Polylactic acid resin | Weight average molecular weight | ×10,000 | 25 | 22 | 21 | 17 | 15 | 23 | 22 | 19 |
|  | Solid phase polymerizability |  | A | A | A | A | A | A | A | A |
|  | Fusibility of pellets |  | A | A | A | A | A | A | A | A |

Examples 2 to 8, Comparative Examples 1 to 7

In the same manner as in Example 1, except that the prepolymer, crystallization conditions and solid phase polymerization conditions to be used are as shown in Table 1 and Table 2, an operation was performed. As shown in Table 1 and Table 2, in Comparative Example 1, since the prepolymer has too low weight average molecular weight, solid phase polymerization did not sufficiently proceed. In Comparative Example 2, the prepolymer has too high weight average molecular weight, solid phase polymerization did not sufficiently proceed. In Comparative Example 3, since the prepolymer has too high optical purity, solid phase polymerization did not

TABLE 2

|  |  |  | Comparative Example | | | | | | |
|---|---|---|---|---|---|---|---|---|---|
|  |  |  | 1 | 2 | 3 | 4 | 5 | 6 | 7 |
|  | Prepolymer |  | A-5 | A-6 | A-7 | A-8 | A-1 | A-1 | A-1 |
| Crystallization conditions | Plasticization temperature | ° C. | 140 | 180 | 180 | 160 | 160 | 160 | 160 |
|  | Crystallization temperature | ° C. | 70 | 130 | 140 | 70 | 145 | 60 | 120 |
|  | Shear rate | 1/second | 150 | 150 | 150 | 150 | 5 | 150 | 150 |
|  | Retention time | Minute | 1 | 1 | 1 | 1 | 1 | 1 | 15 |
| Crystallized prepolymer | Weight average molecular weight | ×10,000 | 0.3 | 10.4 | 2.0 | 2.5 | 2.3 | 2.3 | 2.3 |
|  | Optical purity | % | 76 | 82 | 98 | 54 | 92 | 92 | 92 |
|  | Crystal melting enthalpy ΔHma | J/g | 15 | 42 | 29 | 8 | 0 | 52 | 55 |
|  | ΔHma(J/g) + (100 − Ea(%))/2 |  | 27 | 51 | 30 | 31 | 4 | 56 | 59 |
| Solid phase polymerization conditions | Final polymerization temperature | ° C. | 150 | 150 | 150 | 150 | 150 | 150 | 150 |
|  | Polymerization time | hour | 60 | 60 | 60 | 60 | 60 | 60 | 60 |
| Polylactic acid resin | Weight average molecular weight | ×10,000 | 3 | 14 | 11 | 4 | 2 | 13 | 12 |
|  | Solid phase polymerizability |  | B | B | B | B | B | B | B |
|  | Fusibility of pellets |  | B | A | A | B | B | A | A |

Examples 9 to 16, Comparative Examples 8 to 14

With respect to the polylactic acid resins obtained in Examples 1 to 8 and Comparative Examples 1 to 7, molecular weight, optical purity, heat characteristic, hydrolysis resistance, moldability, and drawdown resistance were measured in the following manner. The results are shown in Table 3 and Table 4. As shown in Table 3 and Table 4, high hydrolysis resistance, moldability and drawdown resistance were observed in all Examples 9 to 16, whereas, sufficient characteristics could not obtained in all Comparative Examples 8 to 14. It is apparent that Examples are excellent.

TABLE 3

|  |  | Example | | | | | | | |
|---|---|---|---|---|---|---|---|---|---|
|  |  | 9 | 10 | 11 | 12 | 13 | 14 | 15 | 16 |
| Polylactic acid resin |  | Example 1 | Example 2 | Example 3 | Example 4 | Example 5 | Example 6 | Example 7 | Example 8 |
| Weight average molecular weight | ×10,000 | 25 | 22 | 21 | 17 | 15 | 23 | 22 | 19 |
| Molecular weight distribution |  | 2.6 | 2.6 | 2.6 | 2.5 | 2.5 | 2.7 | 2.6 | 2.5 |
| Optical purity | % | 92 | 92 | 92 | 92 | 92 | 88 | 82 | 76 |
| Melting point Tm 1st run | °C. | 171 | 170 | 169 | 170 | 172 | 168 | 162 | 155 |
| Crystal melting enthalpy ΔHmb | J/g | 75 | 73 | 73 | 85 | 88 | 81 | 66 | 64 |
| Melting point Tm 2nd run | °C. | 154 | 153 | 155 | 155 | 157 | — | — | — |
| Crystal melting enthalpy ΔHmc | J/g | 2 | 4 | 5 | 10 | 13 | — | — | — |
| ΔHmb − ΔHmc | J/g | 73 | 69 | 68 | 75 | 75 | 81 | 66 | 64 |
| ΔHmb(J/g) + 0.25 × (100 − Eb(%)) |  | 77 | 75 | 75 | 87 | 90 | 84 | 71 | 70 |
| Hydrolysis resistance |  | A | A | A | A | A | A | B | B |
| Moldability 1 |  | A | A | A | A | A | A | A | A |
| Drawdown resistance |  | A | A | A | A | A | A | A | A |

TABLE 4

|  |  | Comparative Example | | | | | | |
|---|---|---|---|---|---|---|---|---|
|  |  | 8 | 9 | 10 | 11 | 12 | 13 | 14 |
| Polylactic acid resin |  | Comparative Example 1 | Comparative Example 2 | Comparative Example 3 | Comparative Example 4 | Comparative Example 5 | Comparative Example 6 | Comparative Example 7 |
| Weight average molecular weight | ×10,000 | 3 | 14 | 11 | 4 | 2 | 13 | 12 |
| Molecular weight distribution |  | 1.6 | 2.5 | 2.3 | 1.6 | 1.5 | 2.3 | 2.3 |
| Optical purity | % | 76 | 82 | 98 | 54 | 92 | 92 | 92 |
| Melting point Tm 1st run | °C. | — | 156 | 181 | — | 133 | 169 | 174 |
| Crystal melting enthalpy ΔHmb | J/g | — | 75 | 87 | — | 4 | 91 | 96 |
| Melting point Tm 2nd run | °C. | — | — | 169 | — | 132 | 158 | 161 |
| Crystal melting enthalpy ΔHmc | J/g | — | — | 44 | — | 1 | 17 | 26 |
| ΔHmb − ΔHmc | J/g | 0 | 75 | 43 | 0 | 3 | 74 | 70 |
| ΔHmb(J/g) + 0.25 × (100 − Eb(%)) |  | 6 | 80 | 88 | 12 | 6 | 93 | 98 |
| Hydrolysis resistance |  | D | A | A | D | D | A | A |
| Moldability 1 |  | C | C | B | C | C | C | C |
| Drawdown resistance |  | D | A | C | D | D | B | B |

Comparative Example 15

In a reaction vessel equipped with a stirrer and a reflux condenser, 50 parts of L-lactide having an optical purity of 92% was charged and uniformly dissolved under nitrogen atmosphere at 120° C. The temperature was adjusted to 150° C., followed by the addition of 0.02 part of tin (II) octylate and further a reaction for 2 hours reaction to obtain a poly-L-lactic acid. With respect to the obtained polylactic acid resin, the molecular weight, optical purity, heat characteristic, hydrolysis resistance, moldability, and drawdown resistance were measured in the following manner. The results are shown in Table 5.

TABLE 5

| | | | Comparative Example 15 | Comparative Example 16 | Comparative Example 17 |
|---|---|---|---|---|---|
| Polylactic acid resin | Weight average molecular weight | ×10,000 | 23 | 25 | 25 |
| | Molecular weight distribution | | 1.9 | 2.1 | 2.1 |
| | Optical purity | % | 92 | 76 | 97 |
| | Melting point Tm 1st run | ° C. | 153 | — | 166 |
| | Crystal melting enthalpy ΔHmb | J/g | 24 | — | 30 |
| | Melting point Tm 2nd run | ° C. | — | — | — |
| | Crystal melting enthalpy ΔHmc | J/g | — | — | — |
| | ΔHmb − ΔHmc | J/g | 24 | 0 | 30 |
| | ΔHmb(J/g) + 0.2 5 × (100 − Eb(%)) | | 26 | 6 | 31 |
| | Hydrolysis resistance | | D | D | C |
| | Moldability 1 | | A | A | A |
| | Drawdown resistance | | D | C | C |

Comparative Examples 16 and 17

In the same manner as in Comparative Example 15, except that the optical purity of lactide to be used was changed to 76% in Comparative Example 16, and 97% in Comparative Example 17, n operation was performed. The results are shown in Table 5.

As shown in Table 5, in Comparative Examples 15 to 17, polylactic acid resins were obtained by ring-opening polymerization. The weight average molecular weight of the polylactic acid resins was large, but molecular weight distribution was less than 2.2. These polylactic acid resins were inferior in drawdown resistance and were also inferior in hydrolysis resistance.

Example 17

The polylactic acid resin (100 parts by weight) obtained in Example 1 was mixed with 0.2 part by weight of stearyl acid phosphate as a stabilizer, and the mixture was melt-kneaded at 190° C. using a twin screw extruder. The obtained polylactic acid resin containing the stabilizer was melted at 180° C. and then molded in accordance with the description of the above mentioned (moldability 2). The results are shown in Table 6.

TABLE 6

| | | Example 17 | Comparative Example 18 | Comparative Example 19 |
|---|---|---|---|---|
| Polylactic acid resin to be used | | Example 1 | Comparative Example 17 | Comparative Example 17 |
| Molding temperature | ° C. | 180 | 180 | 200 |
| Moldability 2 | | A | B | A |
| Appearance of molded article | | A | — | B |
| State upon molding | | No gas was generated | — | Gas was generated |

Comparative Examples 18 and 19

In the same manner as in Example 17, except that the polylactic acid resin and the molding temperature to be used were changed as shown in Table 6, an operation was performed. The results are shown in Table 6. As shown in Table 6, in Example 17, a gas was scarcely generated because of low molding temperature, and also the obtained molded article exhibits satisfactory appearance without causing wrinkles due to drawdown. In Comparative Example 18, since a polylactic acid resin has high crystallinity, the resin was not melted at a molding temperature of 180° C. and thus failed to perform molding. In Comparative Example 19, while a molded article could be obtained by adjusting a molding temperature to 200° C., poor appearance such as wrinkles was observed due to high temperature.

According to the present invention, it is possible to obtain a polylactic acid resin which is excellent in moldability upon melt processing and drawdown resistance upon melt processing, and is also excellent in hydrolysis resistance.

The invention claimed is:

1. A method for producing a polylactic acid resin, comprising crystallizing a prepolymer, which includes a lactic acid unit as a main component and has an optical purity of 60 to 94% and a weight average molecular weight of 5,000 to 100,000, to obtain a crystallized prepolymer, and subjecting the crystallized prepolymer, which includes a lactic acid unit as a main component, has an optical purity (Ea) of 60 to 94%, has a weight average molecular weight of 5,000 to 100,000, and a crystal melting enthalpy (ΔHma) of 4 to 50 J/g, to solid phase polymerization to obtain a polylactic acid resin.

2. The method for producing a polylactic acid resin according to claim 1, wherein the optical purity (Ea) and the crystal melting enthalpy (ΔHma) of the crystallized prepolymer satisfy the following inequality expression (1):

$$24 \leq \Delta Hma(\text{J/g}) + (100 - Ea(\%))/2 \leq 53 \tag{1}.$$

3. The method for producing a polylactic acid resin according to claim 1, wherein crystallizing the prepolymer is performed by retaining at a temperature in a range from 70 to 140° C. in a melting machine under applied shear to obtain a crystallized prepolymer.

4. The method for producing a polylactic acid resin according to claim 3, wherein a shear rate in the melting machine is from 10 to 400/second.

5. The method for producing a polylactic acid resin according to claim 3, wherein the retention time in the melting machine is from 0.5 to 10 minutes.

6. The method for producing a polylactic acid resin according to claim 1, wherein the temperature condition of the solid phase polymerization step is in a range from 70 to 155° C.

* * * * *